United States Patent
Zhou et al.

(10) Patent No.: US 10,052,932 B2
(45) Date of Patent: Aug. 21, 2018

(54) VEHICLE WASTE ENERGY HARVESTING SYSTEM

(71) Applicant: Toyota Motor Engineering & Manufacturing North America, Inc., Erlanger, KY (US)

(72) Inventors: Feng Zhou, South Lyon, MI (US); Gaohua Zhu, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 321 days.

(21) Appl. No.: 14/934,814

(22) Filed: Nov. 6, 2015

(65) Prior Publication Data

US 2017/0129307 A1    May 11, 2017

(51) Int. Cl.
| | |
|---|---|
| *B60H 1/00* | (2006.01) |
| *B60H 1/02* | (2006.01) |
| *B60H 1/32* | (2006.01) |
| *F25B 27/00* | (2006.01) |
| *B60H 1/20* | (2006.01) |
| *F25B 25/02* | (2006.01) |
| *F25B 27/02* | (2006.01) |
| *B60H 1/04* | (2006.01) |

(52) U.S. Cl.
CPC .......... *B60H 1/00385* (2013.01); *B60H 1/02* (2013.01); *B60H 1/3201* (2013.01); *B60H 1/025* (2013.01); *B60H 1/04* (2013.01); *B60H 1/20* (2013.01); *F25B 25/02* (2013.01); *F25B 27/007* (2013.01); *F25B 27/02* (2013.01)

(58) Field of Classification Search
CPC .... B60H 1/00385; B60H 1/02; B60H 1/3201; F25B 25/02; F25B 27/02; F25B 27/007
USPC ........................................................ 165/202
See application file for complete search history.

(56) References Cited

U.S. PATENT DOCUMENTS

| | | | |
|---|---|---|---|
| 8,099,969 B2 | 1/2012 | Henning et al. | |
| 2005/0260469 A1* | 11/2005 | Forte ................. | H01M 8/04022 |
| | | | 429/414 |
| 2012/0000220 A1 | 1/2012 | Altay | |
| 2013/0192281 A1 | 8/2013 | Nam et al. | |
| 2014/0157815 A1 | 6/2014 | Mckay et al. | |
| 2016/0257180 A1* | 9/2016 | Zhou ................. | B60H 1/00492 |

* cited by examiner

*Primary Examiner* — Jianyang Atkisson
*Assistant Examiner* — Joel Attey
(74) *Attorney, Agent, or Firm* — Christopher G. Darrow; Darrow Mustafa PC

(57) ABSTRACT

An adsorption based system is provided for the selective cooling and heating of a vehicle compartment using by-product water collected from a power generating unit of a vehicle. The system may include a fuel cell stack and an exhaust conduit configured to transfer an exhaust stream from the fuel cell stack. A water reservoir stores by-product water collected from the exhaust stream. The system may include a coolant loop configured to circulate a coolant fluid. A detachable adsorption subsystem is in thermal communication with the coolant loop and the exhaust conduit, and may include an evaporator and an adsorbent bed. The adsorption subsystem is configured to: vaporize water from the water reservoir using the evaporator; adsorb the vaporized water, thereby cooling a portion of the coolant fluid; regenerate the adsorbent bed using heat from the exhaust stream to release water vapor; and direct the water vapor into the exhaust conduit.

15 Claims, 2 Drawing Sheets

VEHICLE WASTE ENERGY HARVESTING SYSTEM

TECHNICAL FIELD

The present disclosure generally relates to thermal energy management systems, and more particularly, to systems and methods for improving heating and cooling techniques in a fuel cell powered vehicle, leading to enhanced energy density and power density.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Renewable energy sources are becoming increasingly important. Various benefits can be obtained when waste products and by-products are captured and/or converted into a form of usable energy. Certain climate systems for fuel cell powered, electric powered, and hybrid vehicles may be inefficient or may place a significant drain on the main vehicle battery. Supplemental adsorption-based thermal batteries have recently been developed that are capable of providing both heating and cooling of passenger compartments with minimal use of the main vehicle battery. Conventional adsorption-based systems may require the use of an adsorbate, with an accompanying adsorbate storage reservoir, and a condenser, each of which adds weight to a vehicle.

Accordingly, it would be desirable to provide a thermal energy management system having less weight or taking up less space, while still being capable of providing an enhanced range and higher efficiency, or driving distance per unit energy. For example, it would be desirable to have a system that can provide adequate and continuous climate control during increasingly longer drive periods resulting from improved vehicle ranges.

SUMMARY

This section provides a general summary of the disclosure, and is not a comprehensive disclosure of its full scope or all of its features.

In various aspects, the present teachings provide an adsorption-based system for the selective cooling and heating of a vehicle compartment using by-product water collected from a power generating unit of a vehicle. The system may include a fuel cell stack and an exhaust conduit configured to transfer an exhaust stream from the fuel cell stack. A water reservoir stores by-product water collected from the exhaust stream. The system may include a coolant loop configured to circulate a coolant fluid. A detachable adsorption subsystem is in thermal communication with the coolant loop and the exhaust conduit, and may include an evaporator and an adsorbent bed. The adsorption subsystem is configured to: vaporize water from the water reservoir using the evaporator; adsorb the vaporized water, thereby cooling a portion of the coolant fluid; regenerate the adsorbent bed using heat from the exhaust stream to release water vapor; and direct the water vapor into the exhaust conduit.

In other aspects, the present teachings provide a thermal management system for a fuel cell vehicle with a detachable, condenser-free adsorption based air conditioning component. The thermal management system may include a fuel cell stack and an exhaust conduit transferring an exhaust stream from the fuel cell stack. A water reservoir may be provided, configured to store by-product water collected from the exhaust stream. A coolant loop may be provided configured to circulate a coolant fluid. A detachable adsorption subsystem may be provided, including an evaporator and an adsorbent bed. The adsorption subsystem is configured to: cool a portion of the coolant fluid, and regenerate the adsorbent bed using heat from the exhaust stream. By using by-product water from the fuel cell exhaust stream, the adsorption subsystem is not provided with a condenser. A heat exchanger may be provided in selective thermal communication with the coolant loop and the exhaust conduit to provide respective cooling and heating of a vehicle compartment.

In still other aspects, the present teachings provide a method for selectively heating and cooling a vehicle compartment using by-product water recovered from a fuel cell. The method may include collecting by-product water from an exhaust stream of a fuel cell stack of the vehicle. The by-product water may be directed to a detachable, condenser-free adsorption subsystem comprising an evaporator and an adsorbent bed. Expansion of the water in the evaporator cools a portion of the coolant fluid. The method may include directing the cooled coolant fluid to a heat exchanger for use in cooling a vehicle compartment. The method may also include regenerating the adsorbent bed using heat from the exhaust stream to release water vapor. The water vapor released from the adsorbent bed may be directed into the exhaust stream where it is either discarded or subsequently collected in a water reservoir for reuse. Heat from the exhaust stream may also be used to heating the vehicle compartment.

Further areas of applicability and various methods of enhancing the above coupling technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

Figure 1:
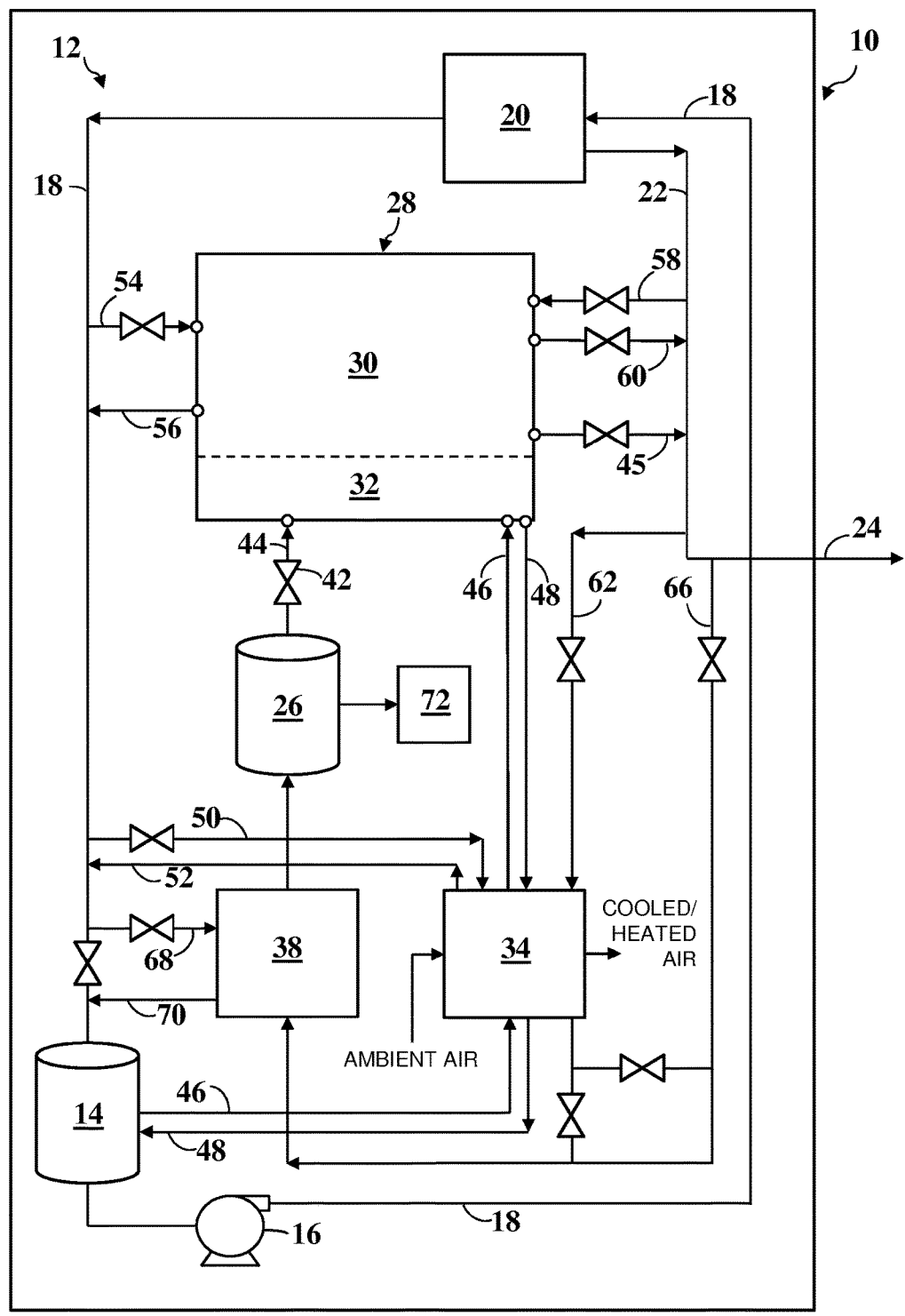
FIG. 1 is an exemplary, simplified schematic illustrating a vehicle configured with an adsorption-based thermal management system with removable components in an accordance with various aspects of the present technology.

It should be noted that the figures set forth herein are intended to exemplify the general characteristics of the methods, algorithms, and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The following description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

The present technology relates to the thermal management of a vehicle using waste heat recovered from a vehicle, as well as certain by-products, such as water obtained from an exhaust stream of a fuel cell. The present technology provides systems and methods for recapturing energy and improving heating and cooling techniques. Specifically, the present technology generally relates to an apparatus and methods for improving an efficiency, power density, and/or energy density of a fuel cell powered vehicle by recapturing heat and by-product water to provide selective heating and cooling to one or more vehicle compartments.

In various aspects, the technology provides a "plug-and-play," or detachable/removable, adsorption-based air conditioning ("AAC") unit, or adsorption subsystem, that does not require a condenser or a condensing process within the AAC unit. For example, the AAC unit can be removed from the vehicle during certain weather conditions, reducing vehicle weight and providing enhanced fuel economy. In use, the AAC unit cooperates with various other components, as will be described below, and may collect by-product water from a fuel cell stack exhaust stream for use as an adsorbate, which minimizes storage needs. Desorbed water vapor from the AAC unit can be discarded due to the potentially continuous supply of water contained within, and capable of being collected from, the fuel cell exhaust stream. Because by-product water from the exhaust stream is typically clean and warm, in various aspects, at least a portion of the by-product water can also be used with a windshield wiper unit for deicing needs in addition to being directed to the AAC unit.

As used herein, the term "vehicle" should be construed having a broad meaning, and should include all types of vehicles, with non-limiting examples including a passenger car, truck, motorcycle, off-road vehicle, bus, boat, airplane, helicopter, lawn mower, recreational vehicle, amusement park vehicle, farm vehicle, construction vehicle, tram, golf cart, train, or trolley, etc.

In various non-limiting aspects, the present technology may be applicable to hydrocarbon/fossil-fuel (or equivalent) based internal combustion engine vehicles, as well as to hybrid electric vehicles typically having an internal combustion engine as a power generating unit. In various presently preferred aspects, the technology may be most applicable to fuel cell powered vehicles, for example, vehicles having at least one fuel cell or fuel cell stack as a power generating unit to drive a motor. In aspects where a fuel cell is not used, and there is no other renewable source of water within the vehicle, it should be understood that the present technology would additionally incorporate a manual supply of water for use with the AAC unit. This may also involve the use of a larger water reservoir within the vehicle.

FIG. 1 illustrates an exemplary, simplified diagram of a vehicle 10 configured with an absorption-based thermal management system 12 for providing selective heating and cooling features in an accordance with various aspects of the present technology. It should be understood that not all of the components provided in the figures may be used in each aspect, and similarly not all of the components are necessarily shown for clarity reasons.

As depicted, the vehicle 10 may include a coolant reservoir 14 in fluid communication with a coolant loop 18 that is optionally configured with a pump 16 to circulate an engine coolant fluid in a continuous-type loop manner in order to remove heat from a power generating unit 20 such as a fuel cell stack, and transfer the heat to a desired component.

The type of power generating unit 20 may vary based on the type of vehicle. As power generating units 20, internal combustion engines and fuel cell stacks may generate heated exhaust streams directed through an engine exhaust conduit 22 and may require cooling that may be accomplished by using various coolant fluids circulated through an engine coolant loop or conduit system. In one example, the temperature range for a fuel cell exhaust stream may range from about 60° C. to about 160° C., and the exhaust stream generally contains hot air and water vapor. The present technology is configured to operate with an engine coolant generally at or near the temperature of the respective power generating units. In various aspects, the coolant fluid may be de-ionized water, ethylene glycol-water mixtures, or the like.

A detachable/removable AAC unit is generally depicted with reference number 28, and may have various quick-connect type ports, illustrated by circular nodes, connected to various portions of the system loop via conduits, or the like. In the particular aspect shown in FIG. 1, water from a water reservoir 26 may be directed or pumped through an expansion valve 42 and into the AAC unit 28 via a conduit 44. For simplicity, the AAC unit 28 is illustrated as having an evaporator 32 unit or portion, and an adsorber 30 unit or portion that includes an adsorbent bed and adsorbent material, as will be described in more detail below. Generally, the evaporator 32 may be a shell-and-tube type heat exchanger, or another suitable type of heat exchanger as may be desired.

The AAC unit 28 is generally kept at a relatively low pressure. As such, when water enters the AAC unit 28 it vaporizes in the evaporator 32, and absorbs heat from the surroundings, such as from a coolant fluid. In the specific aspect shown, coolant flows from the coolant reservoir 14 into and out of the evaporator 32 via conduits 46 and 48, respectively, and is generally cooled by the evaporation of the water within a flow loop of the evaporator (not shown). It should be understood that while FIG. 1 only depicts a single coolant reservoir 14 and generally one main coolant loop 18, the coolant loop 18 may include various sub-loops within the thermal management system 12 and the sub-loops may use the same coolant fluid. In other instances, certain sub-loops may use different coolant fluids and/or may form or be a separate flow loop.

Once cooled by the evaporator 32, the cooled coolant may flow through a heat exchanger 34, for example an air-liquid heat exchanger, and the ambient air may be passed through (i.e., blown through a fin side of) the heat exchanger 34. The coolant fluid may also optionally flow through the heat exchanger 34 via conduits 50 and 52 in order to adjust a temperature of the cooled air, or to transfer heat to or from a sub-loop, where used.

Air passing through the heat exchanger is thereby cooled (or optionally heated, as will be discussed below) and can be used for a variety of purposes. In various aspects, the air can be used to cool one or more vehicle compartments, either singly or in combination. Importantly, the vehicle compartment may not be limited to just include a passenger cabin. It is envisioned that cooled air can be used to supply a cooling effect to one or more electronics or electronics housing. In vehicles that use a turbocharger or supercharger, the present technology can be used to provide cool air for an engine compartment, for example, for the air intake directed to the engine or turbocharger or supercharger intercooler. It is also contemplated that the present technology will be able to serve as an energy efficient solution to supply cold air or a cooling effect for a refrigeration compartment in a vehicle. Not only can the refrigeration compartment be used for cooling food or beverages, the present technology can provide a stable and efficient solution for the transportation or emergency transport of blood, organs, or other tissues for hospital, surgical, and/or other medical use. Still further, the present technology can also be used with the thermal management of one or more battery packs.

Within the adsorber 30, the water vaporized by the evaporator is subsequently adsorbed by an adsorbent material, and the pressure within the ACC unit 28 is kept at the relatively low level. The selection of adsorbent material can influence the overall efficiency of the thermal management system 12. It is envisioned that various conventional adsorbent materials can be used with the present teachings, including conductive metal binders and substrates. However, the greater the promotion of heat transfer, the greater the level of power density that can be achieved. Thus, certain conventional materials, such as porous oxides, zeolites, and metal organic frameworks (MOFs) may result in poor heat transfer, with a lower than desired power density.

In order to provide increased heat transfer, the present technology provides the use of various nano-architectures and nanostructuring strategies. Through the use of nano-structured adsorbent materials, enhanced contact surface areas are provided between a porous adsorbent material and a thermally conductive material. In various aspects, the present technology provides a porous nanostructure adsorbent material. In one non-limiting example, a porous adsorbent material can be grown onto a continuous three-dimensional framework, such as an inverse opal framework (ordered or non-ordered) by hydrothermal or microwave synthesis techniques. A continuous nano-network can serve as an effective pathway to facilitate fast heat release, thereby increasing a power density of the ACC unit 28. Additionally, the time necessary to regenerate the adsorbent bed may also be decreased. Other nano-architectures useful with the present technology may include nanotubes, nanoflakes, hollow nanospheres, and the like. Non-limiting examples of materials with high thermally conductive properties that can be used to form a three-dimensional framework may include carbon, copper, nickel, gold, and the like.

With renewed reference to FIG. 1, heat may be released and carried away from the adsorbent bed 30 by the coolant fluid, which, as shown, flows into the adsorbent bed through a flow controlled conduit 54, and out of the adsorbent bed though another conduit 56. It is contemplated that regeneration of the adsorbent material can be achieved by using the hot exhaust stream from the fuel cell stack traveling through the exhaust conduit 22. As shown, the hot water-air mixture can flow into the adsorbent bed via a first conduit 58, heat the adsorbent material, and flow out of the AAC unit 28 via a second conduit 60.

As the heated adsorbent bed releases the water vapor, the pressure within the AAC unit 28 will eventually begin to increase. When the built-up interior pressure is higher than a pressure within the exhaust stream 22, or otherwise reaches a threshold value, the desorbed water vapor may be directed to flow into the exhaust stream 22 via a suitable relief conduit 45 with an optional pressure relief valve, and the exhaust stream 22 will ultimately be discarded from the vehicle at an exit 24, or used for other purposes, as will be discussed below. Because the exhaust stream from the fuel cell stack can be used as a substantially continuous supply of clean water when needed, the water vapor created in the regeneration process may simply be discarded, and the present technology is able to provide a condenser-free AAC unit 28. This simplifies the overall design of the AAC unit 28, and not only decreases weight, but decreases the overall volume requirements of the system, which more easily allows for the design of a detachable and removable AAC unit 28.

When the regeneration/desorption process is complete, various control valves that connect the conduits 58, 60 to the exhaust stream 22 will close in order to stop heating the adsorbent bed. Any water vapor remaining in the volume of the AAC unit 28 can simply be adsorbed back into adsorbent bed in order to maintain an interior pressure that is relatively low. In instances where a temperature of the exhaust stream 22 may need to be adjusted prior to or after use with the regeneration/desorption process, additional heat exchangers may be used.

When water in the water reservoir 26 is low or depleted, additional water can easily be obtained from the exhaust stream that generally includes by-product water vapor and air. Thus, the water reservoir 26 can be provided with a relatively low storage capacity in order to reduce weight and decrease a size and volume of the system. In various aspects, the exhaust conduit 22 can be coupled to a pre-existing radiator unit 38 located in the vehicle. If no supplemental cabin heating is required, a portion of the exhaust stream can be directed to the radiator unit 38 via a direct conduit 66, where it is condensed to a liquid phase. The liquid phase by-product water and air may then be routed to the water reservoir 26, where an air purge valve (not shown) can be used to release the air. As shown, the radiator may be in thermal communication with the coolant loop via conduits 68 and 70, with appropriate by-pass valves where necessary or desired.

In certain instances, it may also be necessary to provide supplement heating in the passenger cabin or other vehicle compartment. Accordingly, the present technology also contemplates using waste heat from the fuel cell exhaust stream for heating purposes. In this regard, the exhaust conduit 22 may also be in fluid and/or thermal communication with the heat exchanger 34 via a conduit 62, where the air-water mixture of the exhaust stream transfers heat to air passing over the heat exchanger. Upon leaving the heat exchanger 34, the air-water mixture can either be directed back to the main exhaust conduit 22 via a return connection using conduit 66, or it can be directed to the radiator unit 38 where the by-product water can be separated and collected in the water reservoir 26, as discussed above.

As previously noted, the exhaust stream of the fuel cell stack may provide a substantially continuous source of clean, heated water. Accordingly, in addition to using the by-product water for the AAC unit 28, the present teachings also provide using the by-product water with a window/windshield washer deicing unit 72. Such a deicing unit 72 may be coupled to the water reservoir 26 that serves as the water source for a set of conventional windshield wipers, and/or may include a separate reservoir where necessary or desired.

The coolant loop 18 and exhaust conduit 22 may include a combination of multiple different types of conduit systems, and should not be limited to one conduit, or one type of heat transfer. For example, in certain instances, the AAC unit 28 may also be used to provide heat, via the coolant fluid, to the fuel cell stack during a cold start, or to preheat the inlet hydrogen and air. Still further, the exhaust conduit 22, the power generating unit 20, such as a fuel cell stack, as well as the adsorption subsystem 28, may be used in combination with various phase change materials designed to provide a capability of storing and releasing large amounts of thermal energy for later use. The phase change material may configured to supply heat to a component at a substantially consistent temperature, or to remove and store heat from a component. The phase change material selection may vary, for example, being based on a desired melting point. In certain aspects, zinc may be used as a phase change material. In certain aspects, water may also be used.

Figure 2:
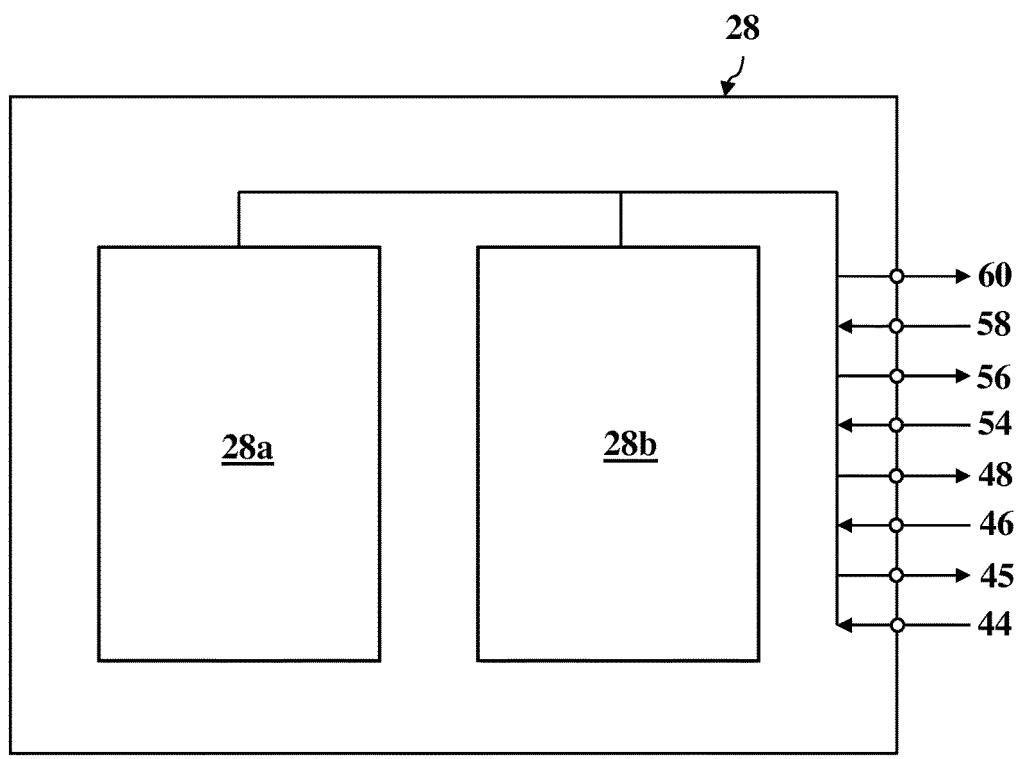
FIG. 2 is an exemplary, simplified flowchart illustrating a twin-cell adsorption pack configuration that may be used in accordance with various aspects of the present technology.

In certain aspects, a twin-cell AAC unit 28 can be used. FIG. 2 is a simplified schematic illustrating a two adsorber unit 28a, 28b configuration that may be used in accordance with various aspects of the present technology, where each unit 28a, 28b can operate independently from one another. A twin-cell system provides the ability for the continuous use of the thermal management system. For example, a first unit 28a may be operating in an adsorption, or cooling, mode while the second unit 28b is operating in a desorption or regeneration mode. Of course, more than two units can also be used. Although FIG. 2 does not provide the details of the conduit connections, it should be understood that this embodiment can also similarly provide suitable quick-connect type couplings between the various conduits 44, 45, 46, 48, 54, 56, 58, 60 in order to provide a detachable ACC unit 28, for example, that can be removed from the vehicle in the winter or during mild weather to reduce weight and provide enhanced fuel economy, and replaced when desired.

In various aspects, at least one controller may be provided to control various devices, systems, and methods according to the present teachings. The controller may include one or more processors with software and appropriate algorithms that may cooperate with one or more thermostats, other controllers, or computer systems of the vehicle, which are not specifically shown herein for purposes of simplicity. Thus, it should be understood that the controller may be in direct or indirect communication with various components of the system, even if it is not specifically shown. Certain methods may use computer program products accessible from a computer-usable or computer-readable medium providing program or software code that can be used with a computer, computing device, server, remote server, or any other type of execution system. For purposes of this description, and as known to those of ordinary skill in the art, a computer-usable or computer-readable medium can include any device or apparatus that can contain, store, communicate, propagate, or transport the program for use by or in connection with an instruction execution system, apparatus, or device.

In one example, the controller may be configured to monitor, operate, and separately direct a flow of coolant fluid, optionally using various valves, through the coolant loop conduit system 18. In another example, the controller may be configured to monitor, operate, and separately control a flow of an exhaust stream from the fuel cell 20, optionally using various valves, through the exhaust conduit 22.

In addition to the systems described above, the present technology additionally provides methods for selectively heating and cooling a vehicle compartment using waste heat recovered from a vehicle and/or by-product water from a fuel cell. The methods may begin by collecting by-product water from an exhaust stream of a fuel cell stack of the vehicle. This may include, by way of example, condensing water vapor within the exhaust stream using a radiator in thermal communication with a fuel cell exhaust conduit. The by-product water may be directed to a detachable, condenser-free adsorption subsystem comprising an evaporator and an adsorbent bed. Expansion of the water in the evaporator cools a portion of the coolant fluid. The method may include directing the cooled coolant fluid to a heat exchanger for use in cooling a vehicle compartment. The method may also include regenerating the adsorbent bed using heat from the exhaust stream to release water vapor. The adsorbent bed may include a porous nanostructure or nano-network as described above. The water vapor released from the adsorbent bed may be directed into the exhaust stream where it is either discarded or subsequently collected in a water reservoir for reuse.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. An adsorption based system providing selective cooling and heating to a vehicle compartment using by-product water collected from a power generating unit of a vehicle, the system comprising:
 a fuel cell stack;

an exhaust conduit transferring an exhaust stream from the fuel cell stack;

a water reservoir configured to store by-product water collected from the exhaust stream;

a coolant loop configured to circulate a coolant fluid; and an adsorption subsystem in thermal communication with the coolant loop and the exhaust conduit, the adsorption subsystem comprising an evaporator and an adsorbent bed and configured to:

vaporize by-product water from the water reservoir using the evaporator;

adsorb the vaporized by-product water in the adsorbent bed, thereby cooling a portion of the coolant fluid;

regenerate the adsorbent bed using heat from the exhaust stream to release water vapor; and direct the water vapor into the exhaust conduit.

2. The system according to claim 1, wherein the adsorption subsystem is selectively detachable from the vehicle for removal when cooling of the vehicle compartment is not desired, thereby removing weight and increasing fuel efficiency of the vehicle.

3. The system according to claim 1, wherein the adsorbent bed comprises a porous nanostructure adsorbent material.

4. The system according to claim 3, wherein the porous nanostructure adsorbent material is grown on a continuous three-dimensional inverse opal framework.

5. The system according to claim 4, wherein the continuous three-dimensional inverse opal framework comprises at least one of carbon, copper, and gold.

6. The system according to claim 1, further comprising a windshield deicing unit coupled to the water reservoir.

7. The system according to claim 1, further comprising an air-liquid heat exchanger in selective thermal communication with the coolant loop and the exhaust conduit to provide respective cooling and heating of the vehicle compartment.

8. The system according to claim 1, further comprising a phase change material in thermal communication with at least one of the exhaust conduit, the fuel cell stack, and the adsorption subsystem.

9. The system according to claim 1, wherein the exhaust conduit is in thermal communication with a pre-existing radiator unit in the vehicle to condense water from the exhaust stream for collection in the water reservoir.

10. The system according to claim 1, wherein the adsorption subsystem comprises first and second adsorbent beds configured to work independently from one another, such that the first adsorbent bed may be operating in an adsorption mode while the second adsorbent bed is operating in a desorption or regeneration mode.

11. A thermal management system for a fuel cell vehicle with a detachable, condenser-free adsorption based air conditioning component, the thermal management system comprising:

a fuel cell stack;

an exhaust conduit transferring an exhaust stream from the fuel cell stack;

a water reservoir configured to store by-product water collected from the exhaust stream;

a coolant loop configured to circulate a coolant fluid;

a detachable adsorption subsystem comprising an evaporator and an adsorbent bed, the detachable adsorption subsystem configured to: cool a portion of the coolant fluid, and regenerate the adsorbent bed using heat from the exhaust stream; and a heat exchanger in selective thermal communication with the coolant loop and the exhaust conduit to provide respective cooling and heating of a vehicle compartment.

12. The thermal management system according to claim 11, wherein the adsorbent bed comprises a porous nanostructure adsorbent material grown on a three-dimensional inverse opal framework comprising at least one of carbon, copper, and gold.

13. The thermal management system according to claim 11, further comprising a windshield deicing unit coupled to the water reservoir.

14. The thermal management system according to claim 11, wherein the detachable adsorption subsystem comprises first and second adsorbent beds configured to work independently from one another, such that the first adsorbent bed may be operating in an adsorption mode while the second adsorbent bed is operating in a desorption or regeneration mode.

15. The thermal management system according to claim 11, further comprising a radiator unit in thermal communication with the exhaust conduit and configured to condense water from the exhaust stream for collection in the water reservoir.

* * * * *